United States Patent [19]

Miura et al.

[11] Patent Number: 4,864,207
[45] Date of Patent: Sep. 5, 1989

[54] UNMANNED VEHICLE GUIDANCE SYSTEM

[75] Inventors: Tokuki Miura; Fumio Yamauchi, both of Tokyo, Japan

[73] Assignee: NEC Corporation, Japan

[21] Appl. No.: 326,422

[22] Filed: Mar. 22, 1989

Related U.S. Application Data

[63] Continuation of Ser. No. 897,333, Aug. 18, 1986, abandoned.

[30] Foreign Application Priority Data

Aug. 20, 1985 [JP] Japan ................. 60-183331

[51] Int. Cl.$^4$ ............................ G05B 19/42
[52] U.S. Cl. .................... 318/587; 180/168
[58] Field of Search ............ 318/587; 180/168, 169, 180/170

[56] References Cited

U.S. PATENT DOCUMENTS

| | | | |
|---|---|---|---|
| 3,787,726 | 1/1974 | Krapp | 318/582 |
| 4,344,498 | 8/1982 | Lindfors | 318/587 X |

FOREIGN PATENT DOCUMENTS

| | | | |
|---|---|---|---|
| 0129808 | 3/1979 | Japan | 318/587 |
| 0075318 | 5/1982 | Japan | 318/587 |
| 0033718 | 2/1983 | Japan | 318/587 |
| 0044515 | 3/1983 | Japan | 318/587 |
| 0163017 | 9/1983 | Japan | 318/587 |
| 0117613 | 7/1984 | Japan | 318/587 |
| 0180611 | 10/1984 | Japan | 318/587 |
| 0201409 | 10/1985 | Japan | 318/587 |
| 0209816 | 10/1985 | Japan | 318/587 |

Primary Examiner—Benjamin Dobeck
Attorney, Agent, or Firm—Leydig, Voit & Mayer

[57] ABSTRACT

An unmanned vehicle guidance system has a guide lane pattern and sensors. The guide lane pattern is formed by placing or burying an object to be detected in a lattice manner on or in a floor surface. The sensors are loaded on an unmanned vehicle and detect the object to be detected.

11 Claims, 5 Drawing Sheets

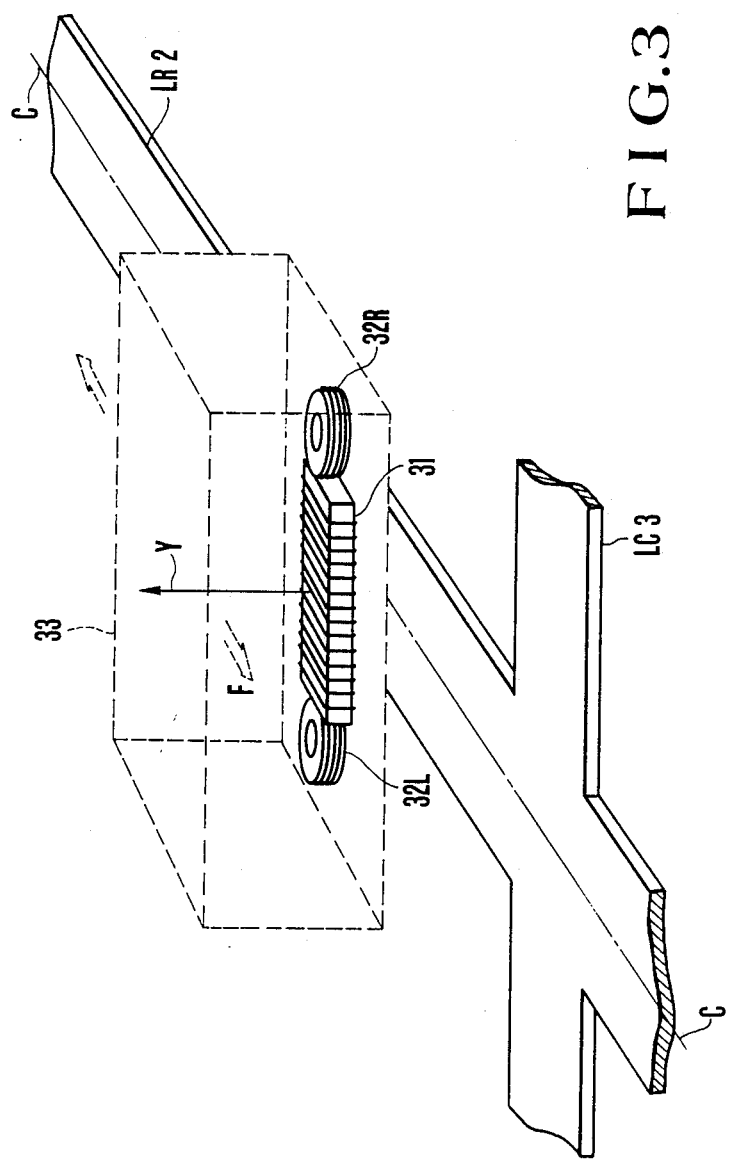

UNMANNED VEHICLE GUIDANCE SYSTEM

This application is a continuation of application Ser. No. 897,333 filed Aug. 18, 1986, now abandoned.

BACKGROUND OF THE INVENTION

The present invention relates to a guidance system for guiding an unmanned vehicle which automatically transports goods in an office or a factory.

Recently, a system for transporting documents, goods, component parts, and so on by an unmanned vehicle along a predetermined course in an office or a factory has been put into practical use. Various types of guidance systems are proposed for guiding the unmanned vehicle to a target position correctly within a minimum time. Some of such guidance systems are practically used. A guidance system of this type consists of, in principle, guide lanes arranged on a predetermined course and comprising a light-reflecting plate, a metal plate, a magnetic plate or the like, markers for notifying the position of the vehicle, sensors, such as photoelectric sensors, metal sensors, or magnetic sensors, for detecting a positional deviation with respect to the corresponding markers, an auto drive system for driving the unmanned vehicle by output signals from the sensors, and so on.

In the conventional guidance system of the unmanned vehicle, the following problems are posed. First, guide lanes and markers are provided in, e.g., a factory for a specific course connecting stations which are provided in accordance with the arrangement of the workers and machines. Therefore, when the number or positions of the stations are frequently changed due to the increase in the number of the machines and changes in the positions of the machines, as in recent factories, the guide lanes and markers must be rearranged accordingly, resulting in cumbersome and uneconomical procedures.

In order to prevent deviation from the guide lane, the vehicle usually detects the direction and magnitude of deviation of the unmanned vehicle from the guide lane in accordance with a difference signal between the outputs of two sensors (guide sensors). With this method, when the vehicle is at an intersection or branching point of guide lanes, an output corresponding to the positional deviation of the vehicle cannot be obtained from the difference signal between the outputs of the two guide sensors. Therefore, a marker must be provided in the vicinity of each branching or intersection point, and a marker sensor must be provided to the unmanned vehicle in addition to the guide sensors. With this method, when the number of the branching or intersection points of the guide lanes is increased, a required number of markers is greatly increased, and the cost of the markers shares a considerably large proportion of the cost required for installation of the unmanned vehicle guidance system.

SUMMARY OF THE INVENTION

It is an object of the present invention to provide a convenient unmanned vehicle guidance system which need not be reinstalled once it is installed, even if the number or positions of the stations change.

It is another object of the present invention to provide a simple, low-cost unmanned vehicle guidance system which does not require any special markers other than guide lanes and hence a marker sensor for the unmanned vehicle.

An unmanned vehicle guidance system of the present invention comprises a guide lane pattern formed by placing or burying an object to be detected in a lattice-like manner on or in a floor surface, and sensor means, loaded on an unmanned vehicle, for detecting the object to be detected.

BRIEF DESCRIPTION OF THE DRAWINGS

FIG. 3 is a view for explaining a sensor loaded on the unmanned vehicle;

DETAILED DESCRIPTION OF THE PREFERRED EMBODIMENT

An embodiment of the present invention will be described in detail with reference to the accompanying drawings.

Figure 1:
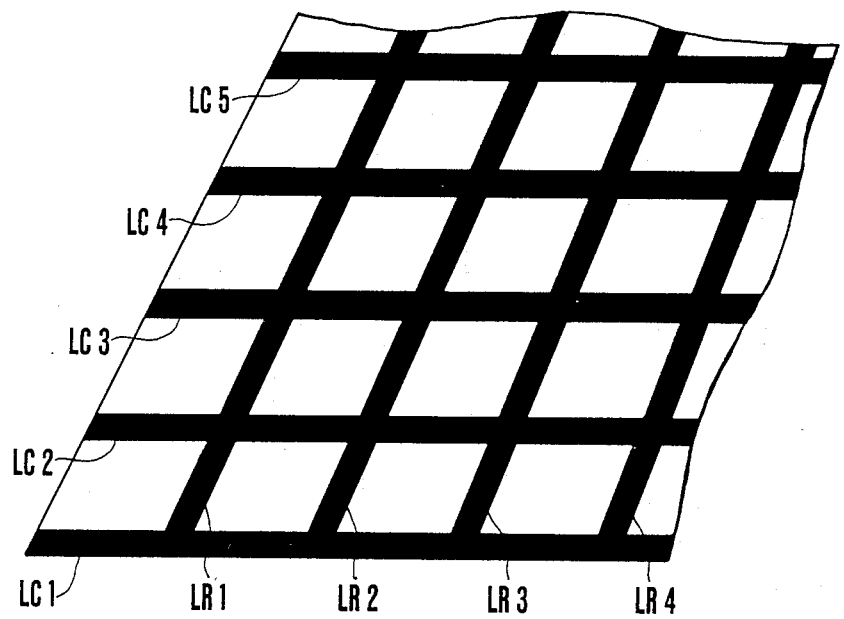
FIG. 1 is an imaginary view of a lattice-like guide lane pattern of an unmanned vehicle guidance system according to the present invention.

FIG. 1 is an imaginary view of a guide lane (lattice lane) pattern of an unmanned vehicle guidance system of the present invention which is installed in a lattice-like manner on a floor surface. Referring to FIG. 1, reference symbols LR1, LR2, ... denote vertical guide lanes represented by black lines for the sake of convenience; and LC1, LC2, ... denote horizontal guide lanes. These guide lanes are placed on or buried in the entire floor surface of, e.g., a factory. The width of each guide lane LCi or LRi (i=1, 2, ...) is e.g., 50 mm. The guide lanes are provided at equal intervals of 250 mm. A course along which the unmanned vehicle drives can be arbitrarily selected in an area provided with such a lattice lane pattern. Therefore, unlike in a conventional system, the guide lanes need not be rearranged due to the addition or relocation of a station. In addition, a marker need not be provided in the vicinity of each intersection point of the guide line, as will be described later.

The guide lane LRi or LCi (i=1, 2, ...) is made of a magnetic material. An appropriate floor material is fitted in the gap (white portion in FIG. 1) between the guide lanes. The overall surface of the lattice lane pattern is covered with a flooring cover member.

Figure 2A:
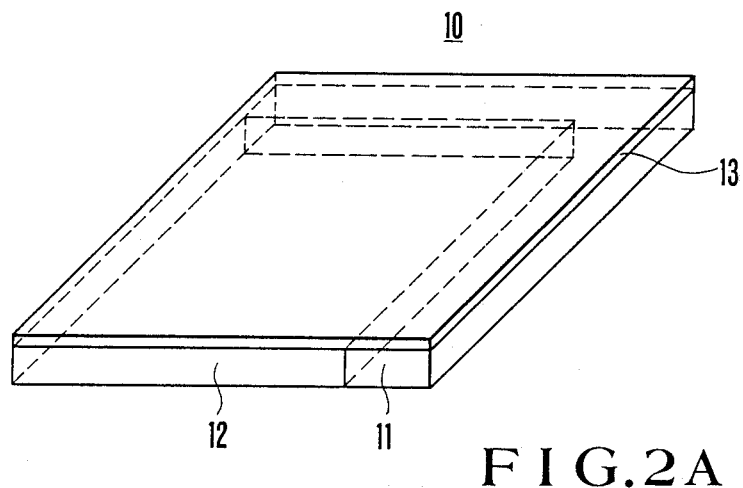
FIGS. 2A and 2B are perspective and bottom views, respectively, of an example of a ferrite tile constituting the lattice-like guide lane pattern shown in FIG. 1.
Figure 2B:
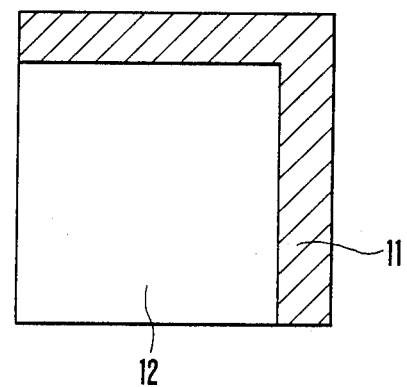

FIGS. 2A and 2B are perspective and bottom views, respectively, for explaining a ferrite tile which is convenient in constituting the lattice lane pattern shown in FIG. 1. Referring to FIGS. 2A and 2B, a ferrite tile 10 is a thin square plate. The ferrite tiles 10 are aligned to constitute the lattice lane pattern. In this embodiment, the ferrite tile 10 has a side of 300 mm length and a thickness of 2 mm. An L-shaped ferrite member 11 is attached to the two adjacent sides of the ferrite tile 10.

In this embodiment, the ferrite member 11 has a width of about 50 mm and a thickness of about 1.6 mm. The ferrite member 11 is obtained by forming and solidifying 60% by weight of a ferrite powder having magnetite ($Fe_3O_4$) as a major constituent and a particle size of 0.1 to 500 microns with a resin or a cement into an L shape. A square base member 12 is made of a vinyl resin and having a side of 250 mm length and a thickness of about 1.6 mm. The base member 12 is fitted inside the arms of the ferrite member 11 and is adhered thereto. A surface layer member 13 of a thickness of 0.4 mm is applied on the upper surfaces of the ferrite member 11 and the base member 12.

A plurality of ferrite tiles 10 are arranged in vertical and horizontal directions on a floor such that their ferrite members 11 are aligned to extend in two directions, thus constituting the lattice lane pattern shown in FIG. 1.

A guide sensor of the unmanned vehicle driving on the lattice lane pattern will be described.

FIG. 3 is a schematic view of guide sensors loaded on the unmanned vehicle and shows a principle of the same. Referring to FIG. 3, reference numeral 31 denotes an exciting coil. The coil 31 is obtained by winding about 150 turns of a wire on a ferrite core having a size of 10×12×50 mm. Reference symbols 32L and 32R denote left and right detecting coils, respectively. Each of the coils 32L and 32R is obtained by winding 150 turns of a wire on a ferrite ring core having a size of 19×19×10 mm. The coils 32L and 32R are arranged on the two sides of the exciting coil 31. The coils 31, 32L and 32R are housed in a shield case 33 having an open lower surface and are respectively connected to a signal processing circuit (not shown). The shield case 33 is mounted to the vehicle body such that the axis of the exciting coil 31, i.e., a line connecting the central points of the detecting coils 32L and 32R, is perpendicular to the guide lane on which the vehicle is currently driving, e.g., the guide lane LR2, as shown in FIG. 3. The unmanned vehicle is guided such that a central portion between the detecting coils 32L and 32R (indicated by a line Y in FIG. 2) constantly drives along the center line C of the guide lane (LR2).

Figure 4:
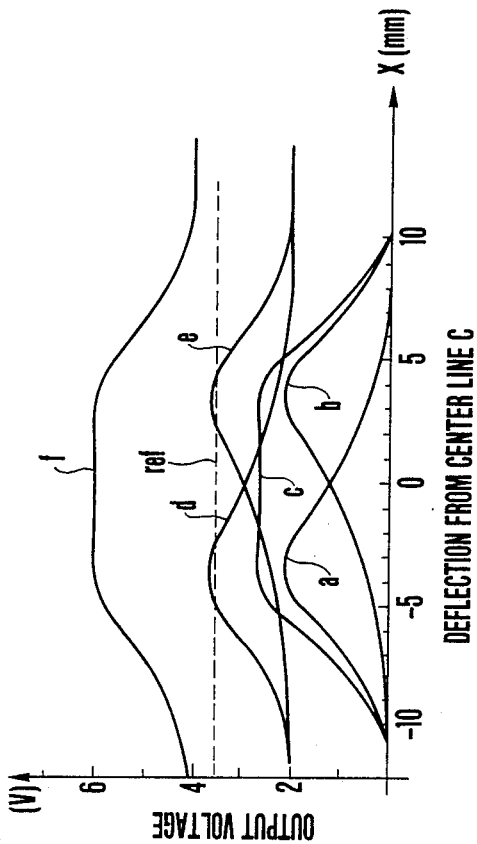
FIG. 4 is a signal waveform chart for explaining a method for detecting an intersection point of the lattice-like guide lane pattern shown in FIG. 1.

FIG. 4 shows signal waveforms of the currents detected from the detecting coils 32L and 32R when a current is supplied to the exciting coil 31. The axis of abscissa x in FIG. 4 represents the deviation of the line Y shown in FIG. 3 to the right or left of the guide lane (LR2). When the unmanned vehicle travels on the guide lane (LR2), the outputs from the detecting coils 32L and 32R have waveforms a and b, respectively. However, during travel in the F direction on the guide lane (LR2), when the unmanned vehicle has reached an intersection point between the guide lanes LR2 and LC3, the guide lane LC3 serves as a marker provided to be symmetrical with respect to the center line C of the guide lane LR2. In this case, the outputs of the detecting coils 32L and 32R have waveforms d and e, respectively, shown in FIG. 4, which have greater amplitudes than the waveforms a and b, respectively. The present invention utilizes this characteristic feature of the detection signals at an intersection point of lattice lanes. Thus, the guidance system of the present invention has a detecting circuit as will be described hereinafter, which does not need a special marker for intersection point detection unlike in the prior art technique.

Figure 5:
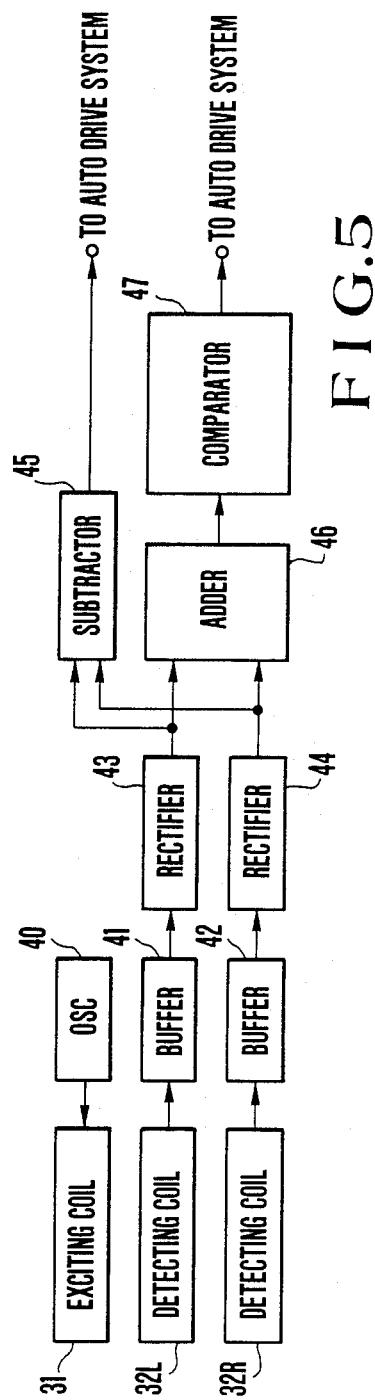
FIG. 5 is a block diagram of a circuit for generating a guidance signal for the unmanned vehicle.

FIG. 5 shows a detecting circuit incorporated in the unmanned vehicle. An exciting current of about 40 kHz is supplied from a quartz oscillator 40 to the exciting coil 31 shown in FIG. 3. The outputs of the detecting coils 32L and 32R shown in FIG. 3 are supplied to rectifiers 43 and 44 through buffers 41 and 42, respectively. Outputs from the rectifiers 43 and 44 are supplied to both a subtractor 45 and an adder 46. The subtractor 45 calculates the difference between the outputs of the rectifiers 43 and 44. As is apparent from FIG. 4, when the central portion (the line Y) between the detecting coils 32L and 32R is on the center line C of the guide lane, the difference signal obtained by the subtractor 45 is zero. When the central portion deviates from the center line C, the difference signal has values of opposite polarities in accordance with the different deviation directions. The output from the subtractor 45 is supplied to an auto drive system, and the unmanned vehicle is thus guided to travel on the center line C of the guide lane.

The adder 46 adds two inputs from the rectifiers 43 and 44. When the unmanned vehicle is not on an intersection point of guide lanes, an output from the adder 46 is a sum signal c of the signals a and b of FIG. 4. When the unmanned vehicle is on an intersection point, an output from the adder 46 is a sum signal f of the signals d and e of FIG. 4. The output from the adder 46 is supplied to a comparator 47 and is compared with a predetermined reference value ref, e.g., 3.5 V. If the output of the adder 46 is larger than the reference value ref, an output from the comparator 47 is at high level ("H"). The output of the comparator 47 is supplied to the auto drive system and is used for automatic unmanned vehicle control.

Figure 6:
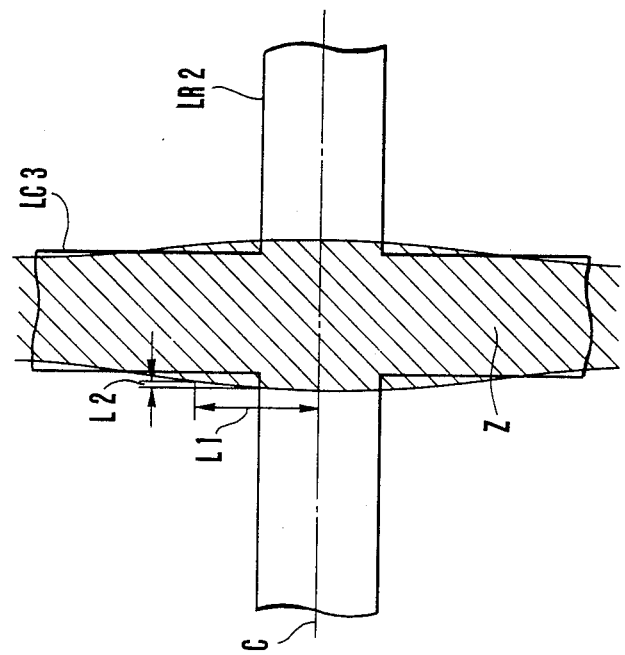
FIG. 6 is a view indicating the detection performance at the intersection point of the circuit shown in FIG. 5.

In FIG. 6, in a hatched zone Z, the output from the comparator 47 is at "H" level. Assume that the unmanned vehicle enters the zone Z at a position deviated from the center line C of the guide lane (LR2), on which it is currently travelling, by a distance L1 to the right or left, as shown in FIG. 6. In this case, a difference L2 between the above position and a position at which the vehicle enters the zone Z as it travels on the center line C along the driving direction is small. In this embodiment, $L2 \approx 5$ mm for $L1 = 30$ mm.

The use of the sum of the output signals from the detecting coils 32L and 32R for intersection point detection is greatly effective particularly when the unmanned vehicle travels in a zigzag manner. More particularly, assume that the sum of the outputs of the detecting coils 32L and 32R is not used. In this case, since the variation in the output level of the coils is too large when the unmanned vehicle travels in a zigzag manner, it is difficult to set a reference voltage (ref) for the output level. In contrast to this, according to the present invention utilizing the sum signal, a considerably wide area with small variations in the sum signals c and f can be obtained on two sides of the center line C of the guide lane, as shown in FIG. 4. When the guide lanes and the detecting coils are appropriately designed, the sum signals can be set substantially constant in this area. As a result, the reference value ref can be easily set and the comparator 47 can have a simple configuration, resulting in high detection precision.

Figure 7:
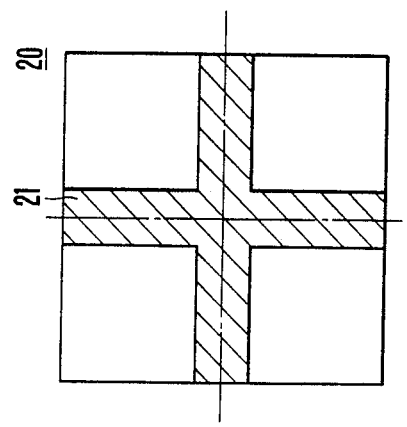
FIGS. 7 and 8 are views for explaining other examples of times constituting the lattice-like guide lane pattern.
Figure 8:
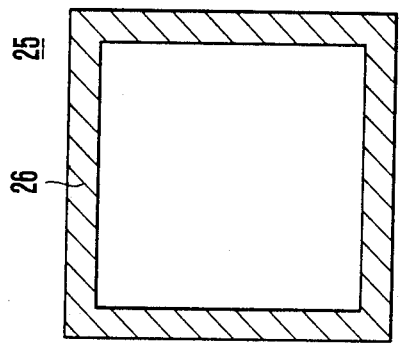

FIGS. 7 and 8 show other examples of a ferrite tile constituting a lattice lane pattern. A tile 20 shown in FIG. 7 has a cross-like ferrite member 21 at its central portion. A tile 25 shown in FIG. 8 has a ferrite member 26 of a constant thickness around the periphery.

As described above, once the lattice-like guide lane pattern of the present invention is installed, it need not be reinstalled regardless of the addition or relocation of stations. This lattice lane pattern can be easily formed by aligning square ferrite tiles each having a cross or square frame-like ferrite member.

The guide lanes intersecting with the travel direction of the unmanned vehicle at the respective intersection points serve as markers which are provided equidistantly.

The unmanned vehicle can detect the presence of the intersecting guide lanes by comparing the sum of the detection outputs of the two guide sensors with a predetermined reference value. Thus, no special marker is needed, and no marker sensor is needed.

In above embodiment, a combination of ferrite and magnetic coils is used. However, the present invention is not limited to this specific combination.

What is claimed is:

1. An unmanned vehicle guidance system comprising:
    a plurality of tiles having the same square shapes and being aligned side-by-side on or in a floor surface so as to form a lattice-like guide lane pattern, each of said plurality of tiles having an L-shaped object to be detected, said object having a width corresponding to that of the guide lane pattern, and a remaining portion of the tiles being filled with a material not to be detected; and
    sensor means, loaded on an unmanned vehicle, for detecting said L-shaped object to be detected but not said material.

2. A system according to claim 1, wherein said L-shaped object to be detected is a magnetic member.

3. A system according to claim 2, wherein said sensor means comprises two detecting coils mounted on right- and left-side portions of said unmanned vehicle with respect to a travel direction thereof, means for calculating a sum of outputs from said detecting coils, and means for comparing a value of the sum with a predetermined reference value and detecting an intersection point of said lattice-like guide lane pattern in accordance with the comparison result.

4. A system according to claim 1 wherein said L-shaped object to be detected comprises a ferrite member and said sensor means comprises magnetic coil means.

5. An unmanned vehicle guidance system comprising:
    a plurality of tiles having the same square shapes and being aligned side-by-side on or in a floor surface so as to form a lattice-like guide lane pattern, each of said plurality of tiles having a central portion to which is attached a cross-like object to be detected, said object having a width corresponding to that of the guide lane pattern so as to form part of said lattice-like guide lane pattern, and a remaining portion of the tiles being filled with a material not to be detected; and
    sensor means, loaded on an unmanned vehicle, for detecting said cross-like object to be detected but not said material.

6. A guidance system for an unmanned vehicle comprising:
    a floor on which guide lanes having a predetermined width are arranged to form a lattice-like guide lane pattern;
    sensor means mounted on said unmanned vehicle for detecting said guide lanes, said sensor means including first and second detecting coils which are spaced a distance greater than the predetermined width of said guide line and produce respective outputs in response to said guide lane;
    an exciting coil disposed between said first and second detecting coils;
    means for calculating the sum of the outputs from said first and second detecting coils; and
    means for comparing the sum to a predetermined reference value to determine an intersection point of said guide lanes;
    said unmanned vehicle being guided such that the portion of the vehicle equidistant between said first and second detecting coils travels along the center of said guide lane.

7. A guidance system for an unmanned vehicle comprising:
    a plurality of tiles, each said tile comprising a base member made of a vinyl resin and, adhered thereto, a magnetic member which comprises a ferrite powder having magnetic ($Fe_3O_4$) as a major constituent and a particle size in the range from about 0.1 to about 500 microns and a resin or a cement, the ferrite powder comprising about 60 percent by weight of the magnetic member and being solidified by the resin or cement, said plurality of tiles being aligned to form a lattice-like guide lane pattern of the magnetic members; and
    sensor means mounted on an unmanned vehicle for detecting a guide lane.

8. The guidance system of claim 6 wherein the sensor means further includes oscillator means for supplying an exciting current to the exciting coil, buffer means connected to the output of the first and second detecting coils, rectifier means connected between the buffer means and the calculating means, and means connected to the rectifier means for calculating the difference between the coil outputs.

9. A guidance system for an unmanned vehicle comprising:
    a plurality of tiles, each tile including an L-shaped ferrite member, a base member attached to the ferrite member, and a surface layer member disposed on upper surfaces of the ferrite member and the base member, said plurality of tiles being aligned to form a lattice-like guide lane pattern of the ferrite members of said tiles; and
    sensor means mounted on an unmanned vehicle for detecting a guide lane.

10. A guidance system for an unmanned vehicle comprising:
    a plurality of tiles, each tile including a cross-like ferrite member, a base member attached to the ferrite member; and a surface layer member disposed on upper surfaces of the ferrite member and the base member, said plurality of tiles being aligned to form a lattice-like guide lane pattern of the ferrite members of said tiles; and
    sensor means mounted on an unmanned vehicle for detecting a guide lane.

11. A guidance system for an unmanned vehicle comprising:
    a plurality of tiles, each tile including a ferrite member configured as a hollow square, a base member attached to the ferrite member and a surface layer member disposed on upper surfaces of the ferrite member and the base member, said plurality of tiles being aligned to form a lattice-like guide lane pattern on the ferrite members of said tiles; and
    sensor means mounted on the unmanned vehicle for detecting a guide lane.

* * * * *